Patented Sept. 30, 1930

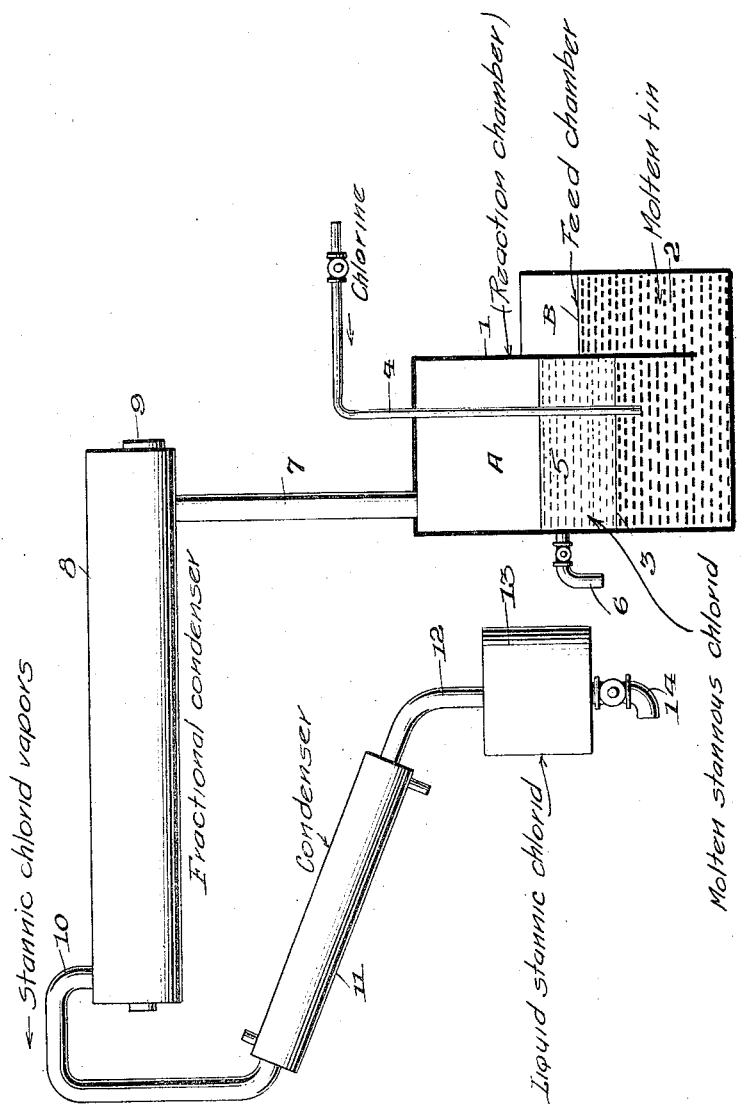

1,777,132

UNITED STATES PATENT OFFICE

WALTON S. SMITH, OF ELIZABETH, NEW JERSEY

PROCESS OF MAKING TIN CHLORIDES

Application filed June 18, 1927. Serial No. 199,740.

This invention relates to processes of making tin chlorides; and it comprises a method of making stannic chloride or stannous chloride, or both, in continuous operation wherein a replenished body of molten tin is contacted with chlorin; all as more fully hereinafter set forth and as claimed.

The usual method of making stannic chloride is to treat solid tin with chlorin in the presence of a bath of stannic chloride at the boiling point; vapors of the chloride passing forward to a condenser. Stannic chloride boils at 114° C. and chlorin does not attack iron at this temperature. The method therefore has the convenience that iron apparatus can be used. Incoming chlorin dissolves in the boiling bath of stannic chloride and acts on the tin to make new stannic chloride. The process, however, has the objection that in order to maintain a liquid bath, a temperature of 114° C. cannot be exceeded and since the reaction is highly exothermic considerable amounts of heat must be dissipated. This renders apparatus design inconvenient and very large units are impractical. Furthermore, the process is not continuous since operation must be interrupted from time to time to add more tin. This is not only difficult but is apt to be dangerous since it involves opening a chamber full of hot poisonous vapors.

I have found that I can obtain continuous operation more conveniently by operating at considerably higher temperatures; temperatures at which tin is molten. Tin for replenishment can then be supplied to the reaction chamber in the liquid form without opening up the chamber and continuous operation becomes practicable and safe. Pure tin melts at 235° C. and I operate at temperatures somewhat above this. At these temperatures heat radiation is more active than at 114° C. and it is easier to dispose of the excess heat. Air cooling is much more efficient. The heat evolved in the reaction between the tin and chlorin is sufficient in itself to keep the reaction zone at the temperature wanted, while on the other hand because of the active radiation of heat at the relatively high temperature plane and the consumption of heat in vaporizing stannic chloride where this is made, the temperature does not tend to run away. The amount of heat which can be radiated into air per square foot of radiating surface is much greater than in the other type of appartus. Chambers of any size desired may be used. The tin being molten, replenishment in continuous operation becomes a convenient matter. Molten tin can be fed in or solid pig tin put in an outside continuation of the molten tin bath. The supply of heat is ample to take care of melting. There are not the difficulties attendant in the usual processes where solid tin must be introduced into an appartus full of chlorin and stannic chloride as vapor and liquid.

Various ways of bringing the molten tin and the chlorin into reaction may be used under the present invention. For example, molten tin and chlorin may be atomized together in a suitable reaction chamber. This method is quite convenient where stannous chloride is the main material to be made since it allows accurate proportioning of tin and chlorin. Ordinarily, however, I establish and maintain a reaction mass or bath of molten tin and blow the chlorin through it. According the conditions, the shape of the nozzle, the speed of the chlorin and other circumstances the product resulting may be stannous chloride or stannic chloride or a mixture of the two. With a free flow of chlorin the product is stannic chloride, while with a slow flow of chlorin it may be exclusively or predominantly stannous chloride. In making stannous chloride and using a molten mass of tin, molten stannous chloride may form a supernatant liquid layer of substantial depth and be drawn off as liquid. In making stannic chloride, there may also be a supernatant thin layer of stannous chloride. In the case of using raw materials contaminated with some other metals than tin, such as iron, lead or antimony, these materials are chlorinated also but their chlorides being very much less volatile than stannic chloride can be readily separated by fractional condensation in so far as they volatilize.

In the accompanying illustration I have shown, more or less diagrammatically, one form of apparatus of the many which may be used in practicing the described invention. In this showing, the figure is a view in central vertical section, with certain parts in elevation, of a complete apparatus for making either stannous chloride or stannic chloride or both from molten tin. The tin may be pure or impure. The apparatus may be used in making pure tin chloride from junk tin and tin alloys (solder, etc.).

In the showing, element 1 is a reaction vessel which may be made of iron or any other suitable material. No heating means are required. This apparatus comprises a reaction chamber proper A and a feed chamber B; the two being in liquid communication through port or opening 2 near their base. Both chambers are shown as containing molten tin. Replenishment of the material consumed in A is by the addition of molten tin or pig tin to B. Within chamber A the molten tin assumes a liquid level which I have indicated by 3. Beneath this liquid level passes chlorin introduction pipe 4 leading in chlorin from a source not shown. Above this layer of molten tin may be a second molten layer 5 of stannous chloride. If the apparatus is being run to make stannous chloride, molten stannous chloride may be tapped off from time to time or continuously by gated outlet 6. If the apparatus is being used to make stannic chloride only, vapors of stannic chloride, together (in the case of impure tin or tin alloys) with vapors of ferric chloride or antimony chloride, (either or both), pass upward through vapor conduit 7 into fractional condenser 8. In the fractional condenser any less volatile chlorides which may be present are separated from vapors of stannic chloride. Manholes 9 are provided for cleaning out accumulations formed in chamber 8. This chamber also acts as a precooler, cooling vapors of stannic chloride prior to their going to the condenser. From this chamber vapors pass by conduit 10 to an ordinary water-cooled condenser 11 wherein stannic chloride is condensed to a liquid form.

The liquid flows through conduit 12 to storage tank 13 whence it may be removed by gated outlet 14.

In the manufacture of stannic chloride, the amount of chlorin entering through 4 is so adjusted that the vapors passing through 7 are fully chlorinated but contain no free chlorin. In the manufacture of stannous chloride the amount of chlorin entering through 4 is cut down somewhat. In the ordinary course of operation the apparatus shown can readily be used to produce both stannic chloride which escapes as vapor through 7 and liquid stannous chloride which escapes at 6, with any desired ratio between the two. Both stannous chloride and stannic chloride are valuable marketable products.

The apparatus shown can readily be operated, recovering tin as stannic chloride from various alloys such as solder, typemetal, etc., the operation being exactly the same as just described save that the lead and other metals present will form non-volatile chlorides accumulating in the stannous chloride layer. They can be withdrawn together with stannous chloride by 6.

What I claim is:

1. In the manufacture of pure stannic chloride by a continuous process, the method which comprises leading a current of chlorin into a bath of molten tin, removing vapors of stannic chloride, partially cooling such vapors to produce fractional condensation of impurities and finally condensing the cooled vapors of stannic chloride.

2. In the manufacture of pure tin chloride from stanniferous metals in continuous operation, the process which comprises establishing and maintaining a bath of such stanniferous metal in a molten condition, leading chlorin into the molten metal and removing vapors of volatile chlorides produced thereby, non-volatile chlorides produced being also removed from the bath, cooling the removed vapors to condense chlorides less volatile than stannic chloride and finally condensing the stannic chloride vapors to produce pure stannic chloride in the liquid form.

3. In the manufacture of stannic chloride, the process which comprises establishing and maintaining a bath of molten tin, and continuously leading chlorin thereinto in amount sufficient to produce complete chlorination.

4. In the manufacture of a tin chloride by a continuous process, the method which comprises establishing and maintaining a bath of molten tin and continuously leading thereinto a stream of chlorin, the chlorin being in such amount as to produce a tin chloride.

In testimony whereof I affix my signature.

WALTON S. SMITH.